Patented May 13, 1924.

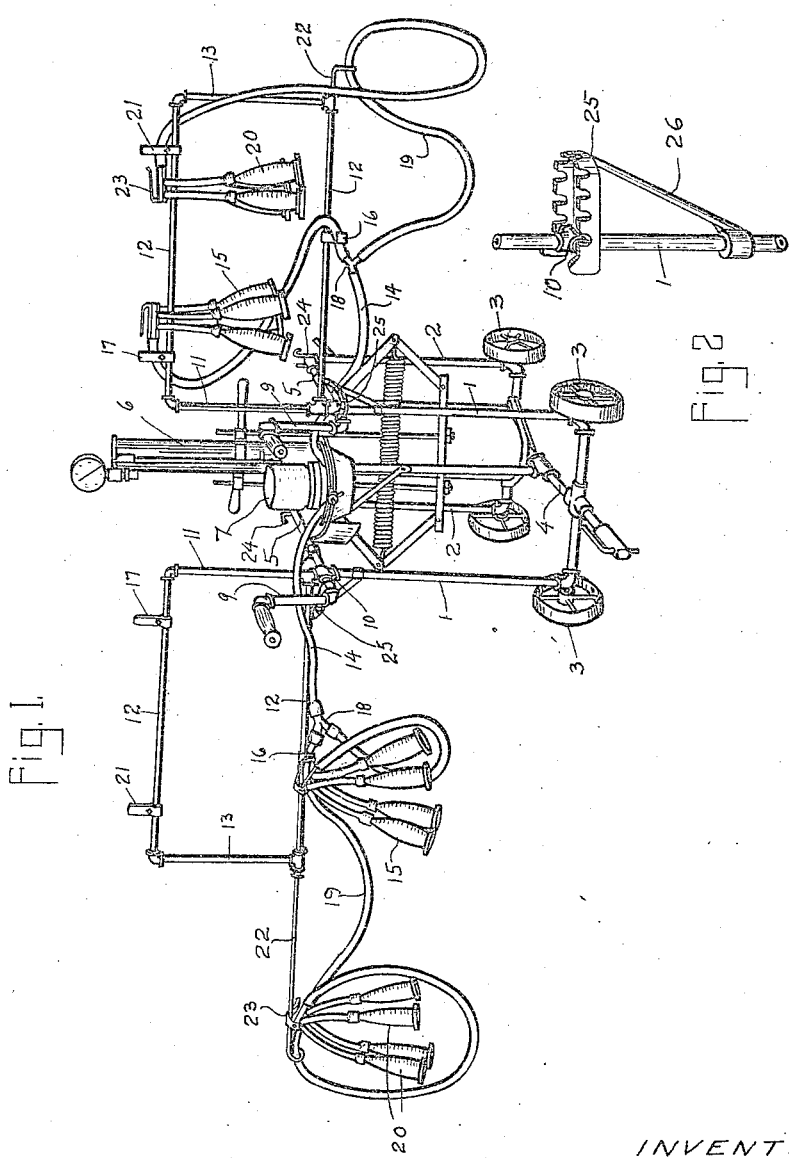

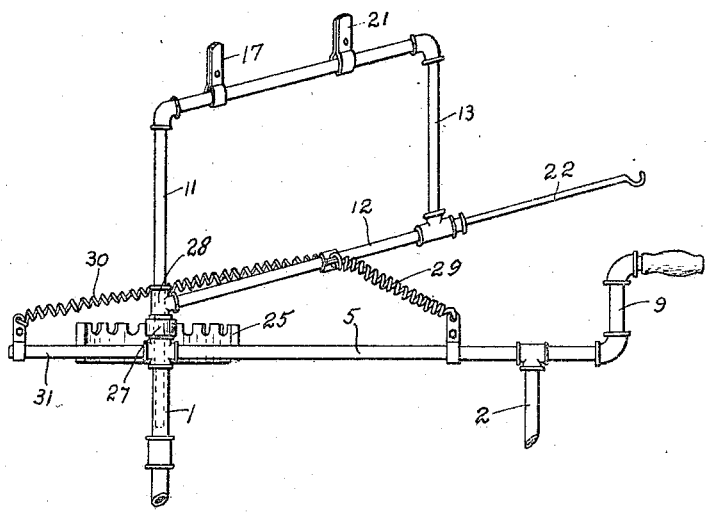

1,494,138

UNITED STATES PATENT OFFICE.

WARREN A. SHIPPERT, OF CHICAGO, ILLINOIS, AND GEORGE BAILEY, OF MILWAUKEE, WISCONSIN.

MILKING-MACHINE TRUCK.

Application filed February 14, 1921. Serial No. 444,717.

*To all whom it may concern:*

Be it known that we, WARREN A. SHIPPERT and GEORGE BAILEY, citizens of the United States, residing, respectively, at Chicago, Cook County, Illinois, and Milwaukee, in the county of Milwaukee and State of Wisconsin, have invented certain new and useful Improvements in Milking-Machine Trucks, of which the following is a specification.

Our invention has reference to milking machine trucks, of that class which are employed for transporting a milking apparatus from place to place, while in use. The chief purpose thereof is to increase the efficiency and capacity of machines of that class, so that the work of milking a number of cows can be more expeditiously carried on.

Trucks of the kind mentioned are usually equipped with a milking outfit, including a hand or motor operated machine, and sets of teat-cup apparatus, having flexible means of connection with the milking machine. When not in use these sets of apparatus are supported on the frame of the truck, not only for convenience in handling, but in order that they may be kept up out of the dirt usually found in the places in which the machines are used. The truck frame has been of such a character as to permit the support of two sets of apparatus thereon, providing for the milking of only two cows at the same time. Where a large number of cows are to be milked the milking period is considerably extended, unless additional machines are made use of.

The present machine aims to increase the capacity of a single machine, or unit, to such an extent that the work of two or more machines can be performed thereby, the capacity being limited only by the power of the vacuum producing mechanism. This is accomplished by the use of auxiliary frames, supported on the main frame in such a way as to be capable of various adjustments with relation thereto. The device is capable of an arrangement whereby, if desired, two or more cows can be milked simultaneously at one side of the truck, or one or more cows on opposite sides of the truck. Other features are included therewith, whereby the machine is more easily handled by a single operator.

The particular construction, arrangement and operation of the various parts of the invention will more fully appear from the following specification, reference being had to the drawings accompanying the same, presenting one embodiment of the machine, wherein:—

Fig. 1 is a perspective view of our invention, with the auxiliary frames in position when in use.

Fig. 2 is an enlarged detail of the rack 25.

Fig. 3 is a detached view of a modification of the device.

The main frame comprises uprights 1 and 2, preferably of tubular formation, supported on wheels 3 and united at their lower ends by a frame 4. Uniting the upper ends of the uprights are bars 5, between which is supported a milking machine outfit, as indicated at 6, and provided with a milk-chamber 7, supported in the frame in such a manner as to permit of a milk-can or other receptacle being supported on the frame 4 below the same. The forward ends of the bars 5 are provided with handles 9, by means of which the truck can be propelled.

The upper ends of the uprights 1 are fitted with connections 10 in which are pivotally supported standards 11, to the upper and lower ends of which are secured bars 12, connected at their outer ends by pieces 13. There are thus formed auxiliary frames, which can be swung horizontally into any desired position with relation to the main frame of the truck.

Connected with the milk chamber 7 are hose sections 14, projected towards opposite sides of the truck, and provided at their outer ends with teat-cup clusters 15. The bars 12 of the auxiliary frames are provided with clips 16 and 17 by means of which said hose sections can be supported. Said hose sections are provided midway their ends with Y's 18, to which are connected additional hose sections 19, provided at their ends with teat-cup apparatus 20, the sections 19 being supported at their outer ends on the upper bars 12, by means of clips 21. The sections 19 are further supported by loops on the ends of rods 22, having a telescopic connection with the lower bars or tubes 12. The teat-cup clusters 20 can also be provided with hooks 23, by means of which they can be hung on the lower bar 12, or on the extension 22 thereof.

The teat-cup clusters are shown at the right hand side of the machine, in Fig. 1, in a position when not in use, and when thus supported the auxiliary frame can be swung inwardly with the bars 12 in line with the bar 5, in which position it can be held by means of a catch 24 on the rear part of such bar. When both of the upper frames are thus held in a closed position the device takes up no more space than that occupied by the portable frame, and can be readily moved from one place to another. When it is desired to use the hose sections at either side of the truck they are supported as shown at the left in Fig. 1, the apparatus 15 being disconnected from the bar 12 and applied to one animal, and the apparatus 20 released from the rod 22 and attached to an adjoining animal. The hose sections are thus at all times supported in a manner to keep the same entirely free from the ground.

When in use a milk can or other receptacle is supported on the frame 4, immediately beneath the milk chamber, whereby the milk which is conducted through the hose sections to the milk chamber can be discharged therefrom into the receptacle. The milking apparatus shown in the drawings is for illustrative purposes only, it being understood that our invention can be adapted to and used with various types of such machines.

To assist in holding the auxiliary frames in adjusted positions we provide racks 25, fixed to the upper ends of the uprights 1, and provided with notches adapted to receive the bars 12, and hold them from swinging. The racks 25 are supported at their outer edges by braces 26.

By providing the upper ends of the uprights 2 with bearings similar to those on the posts 1, one of the auxiliary frames can be supported at that point, and four sets of the teat-cup apparatus used at one side of the truck at the same time.

The hose sections and teat-cup apparatus are so connected as to be readily detached for the purpose of cleansing the same.

In Fig. 3 is shown a form of the device, wherein the auxiliary frame is held in an elevated position by means of a collar 27 on the lower end of the pipe 11, beneath the joint 28 thereon. This supports the bar 12 at such a height that it is out of engagement with the teeth of the arc 25. In this arrangement the arm 12 is in use at an angle with the bar 5, the position varying as the position of the truck is changed, and a too sudden movement of the truck with relation to the auxiliary frame is prevented by means of a coiled spring 29, uniting the bars 12 and 5, and a similar spring 30, connected at one end to the bar 12, and at the other end to an extension 31 of the bar 5. When in this position the device is intended to be handled by a single operator, who can move the machine about without danger of the teat-cup apparatus being pulled from the cows. If there is a rigid connection betwen the main frame and auxiliary frame such separation of the apparatus is liable to occur, upon the truck being moved about, and the slack in the hose taken up. When the machine is being operated by two men the collar 27 and springs 29 and 30 are removed. One of the men then moves the truck and the other looks after the application of the apparatus.

What we claim and desire to secure by Letters Patent, is:

1. A device of the class described, comprising a portable frame, adapted for the support of a milking machine outfit, auxiliary frames swingingly mounted on opposite sides of said portable frame, and adapted for the support of teat-cup apparatus and the hose attachments thereof, means for holding said auxiliary frames in adjusted positions at desired angles with relation to said portable frame, and means for holding said auxiliary frames out of engagement with said last-named means.

2. A device of the class described, comprising a portable frame, adapted for the support of a milking machine outfit, an auxiliary frame swingingly mounted thereon and adapted for the support of teat-cup apparatus and hose attachments therefor, a toothed rack supported by said portable frame, adapted for engagement by said swinging frame, to hold the same in adjusted positions, means for holding said swinging frame out of engagement with said rack, and means for holding said swinging frame yieldably against movement in either direction.

In testimony whereof we affix our signatures.

WARREN A. SHIPPERT.
GEORGE BAILEY.